(12) United States Patent
Stauber (10) Patent No.: US 8,056,705 B2
(45) Date of Patent: Nov. 15, 2011

(54) DEVICE AND METHOD FOR PROCESSING OBJECTS

(75) Inventor: Hans Ulrich Stauber, Grut (CH)

(73) Assignee: FERAG AG, Hinwil (CH)

( * ) Notice: Subject to any disclaimer, the term of this patent is extended or adjusted under 35 U.S.C. 154(b) by 119 days.

(21) Appl. No.: 12/566,825

(22) Filed: Sep. 25, 2009

(65) Prior Publication Data

US 2010/0072028 A1 Mar. 25, 2010

(30) Foreign Application Priority Data

Sep. 25, 2008 (CH) ..................................... 1523/08

(51) Int. Cl.
*B65H 29/00* (2006.01)
(52) U.S. Cl. .................. 198/644; 198/459.2; 198/478.1; 271/82
(58) Field of Classification Search ............... 198/459.2, 198/478.1, 644; 271/277, 82, 187
See application file for complete search history.

(56) References Cited

U.S. PATENT DOCUMENTS

| | | | | |
|---|---|---|---|---|
| 4,629,175 A | * | 12/1986 | Fischer et al. ................. | 271/202 |
| 5,452,886 A | * | 9/1995 | Cote et al. ..................... | 271/270 |
| 5,494,274 A | | 2/1996 | Hansch | |
| 5,725,685 A | * | 3/1998 | Hayakawa et al. ............ | 148/306 |
| 5,855,153 A | * | 1/1999 | Cote et al. ..................... | 83/23 |
| 5,927,712 A | * | 7/1999 | Curley et al. .................. | 271/277 |
| 6,511,065 B1 | * | 1/2003 | Cote et al. ..................... | 271/270 |
| 7,422,212 B2 | * | 9/2008 | Noll et al. ..................... | 271/307 |
| 2004/0231962 A1 | | 11/2004 | Noll, Jr. | |

FOREIGN PATENT DOCUMENTS

| | | |
|---|---|---|
| EP | 0606549 | 7/1994 |
| EP | 0606550 | 7/1994 |
| EP | 0606555 | 7/1994 |
| EP | 0699611 | 3/1996 |
| EP | 1736427 | 12/2006 |
| JP | 01220633 A * | 9/1989 |
| WO | 2007/147269 | 12/2007 |

* cited by examiner

*Primary Examiner* — Mark A Deuble
(74) *Attorney, Agent, or Firm* — Rankin, Hill & Clark LLP

(57) ABSTRACT

The invention relates to a device (10) and a method for processing objects (100, 110) with a plurality of tools (20), as well as with a tool drive arrangement (30). The tools (20) in each case comprise at least one lever (21) as well as an acting element (22) which may cooperate with the object (100, 110). The levers (21) are pivotably attached on tool drive arrangement (30) on bearing points (23) and may be driven along a closed revolving path by way of the movement of the tool drive arrangement (30). The acting elements (22) are distanced to the bearing point (23). The pivot position of the levers (231) relative to the tool drive arrangement (30) may be set in dependence on their position along the revolving path with a guide mechanism. According to the invention, the guide mechanism (40) is adjustable, wherein different distances (d, d') of adjacent acting elements may be realized in a predefined reference region by way of the adjustment.

29 Claims, 7 Drawing Sheets

DEVICE AND METHOD FOR PROCESSING OBJECTS

BACKGROUND OF THE INVENTION

1. Field of the Invention

The invention lies in the field of processing or the transport of objects, in particular of printed products. It relates to a device and to a method according to the preambles of the claims, with which device or with which method the objects are processed with acting elements moved along a closed revolving path, and the distance of the acting elements is to be changed, for example, for adaptation to different formats or transfer locations.

2. Description of Related Art

With the processing of continuously conveyed objects, the distance of the tools used for processing must often be adapted to the distance of the objects in the conveyor flow to be supplied and/or to be released. Various solutions are known for this:

Processing devices and transport devices for printed products are known from EP-A 0 606 55, EP-A 0 606 549 and EP-A 0 606 555, with which tools, e.g. grippers or stitching modules, are moved along an essentially circular path, and with which the distance of the tools changes during their movement along the path. The distance change is achieved by way of the tools being arranged at the outer end of levers, and the orientation of the levers being changed relative to the radial direction by way of cooperation with suitable control elements/guide elements during the revolving.

A similar device which serves as a transfer wheel for singularising continuously conveyed objects, is known from EP-A 1 736 427. Here, the objects are received by grippers at a receiver location and are moved along a circular-arc-like revolving path up to a release location, where they are deposited onto a conveyor belt. The distance of the grippers along the path increases from the receiver location to the release location. For this, the grippers are arranged at the outer end of the levers, whose inner ends are articulated on a circular drive disk and whose orientation with respect to the drive disk is fixed in dependence on the position of the lever along the peripheral path, by guide elements which cooperate with the levers and run along a circular path which is eccentric with respect to the drive disk.

A device for processing, in particular for welding or cutting objects conveyed one after the other in a continuous manner, is known from WO 2007/147269, with which at least two tools are moved with variable speeds along a closed revolving path, in order to realise different processing distances. For this, two drives for example are provided. One of the drives moves the tools at a processing speed which is adapted to the conveying speed, and the other drive moves these at a return speed, which is adapted to the distances to be created. Alternatively, WO 2007/147269 suggests the selective coupling or decoupling of the tools on a continuously operating drive, and thus, of realising different processing distances.

For many applications, it is necessary to change the distance between two tools, e.g. in order to adapt the processing to the current product length or in order to change the distance of two products held by the tools.

Although with the transfer wheel according to EP-A 1 736 427, the distance of two grippers along the revolving path changes, the distance of two consecutive grippers at any reference point along the revolving path is constant. The distance, thus, depends only on the position of the gripper along the revolving path. A format change is only possible by way of different adaptations.

The different drives with the device according to WO 2007/147269, although permitting an adaptation of the processing distance, are however mechanically complicated and expensive in maintenance.

It is therefore the object of the invention, to specify a simple solution for changing the distance of the tools with regard to a processing device.

BRIEF SUMMARY OF THE INVENTION

The device according to the invention includes a plurality of tools as well as a tool drive arrangement, wherein the tools in each case have a lever as well as an acting element, which is capable of cooperating with the object. The levers are pivotably attached on the tool drive arrangement on bearing points, and may be moved along a closed revolving path by way of the movement of the drive arrangement. The acting elements are arranged at a distance to the bearing point, thus in a projecting manner. The pivot position of the levers relative to the tool drive arrangement is variable and is set in dependence on its position along the revolving path, with a guide mechanism. For example, constant distances or ones changing in dependence on the location may be realised along the revolving path. According to the invention, the guide mechanism is designed in an adjustable manner and in a manner such that the pivot positions of the levers may be changed for a given position along the revolving path. With this, different distances of adjacent acting elements may be realised in a certain reference region or on a certain reference point, e.g. in a processing region or at a processing location. Preferably, the position of the guide element relative to the tool drive arrangement may be changed, preferably by way of the guide mechanism being designed in a displaceable manner. However, other adjustment mechanisms may be provided, for example using diverters.

The invention is based on the changeable setting of the pivot position of an acting element which is arranged in a projecting manner via a lever on the tool drive arrangement, by way of an adjustable guide mechanism, with respect to an arbitrary reference point along the path. Depending on the setting of the guide mechanism, the lever, therefore, has different orientations at the same reference point, so that adjacent acting elements may have different distances in the respective region. Different distances of the acting elements may be set in a reference region by way of a suitable choice of the geometry, e.g. the lever length, the distance of the bearing points, the shape and position of the guide mechanism, without necessarily having to change the drive speed. The mechanics which are required for this as a rule may be realised in a simple manner, and in a manner which requires little maintenance, for example by way of displaceable guide elements running with the levers and/or displaceable but otherwise stationary guide mechanism or cam guide with several alternative guide paths. The achieved effect is particularly strong in curved parts of the movement path of the tools or of the bearing points of the levers assigned to them, wherein it may be the case of a concave or convex path shape.

"Processing" is to be understood as any acting on the object, in particular a change of the object for example by way of welding, stitching, printing and/or cutting, but also the mere transport of the object, for example by gripping, taking along and/or deposition. The objects to be processed may be individual ones, but it may also be the case of a material web or material web plus objects e.g. printed products inserted into a film bag. The tools are therefore for example welding modules, stitching modules, printing modules or cutting modules or grippers. The active zone cooperating with the objects is called the acting element.

It is possible by way of the invention, to set different spatial distances of the acting elements at a certain reference location or in a certain reference region of the revolving path. In order words, the distance of two consecutive acting elements, which run past a reference point, may be increased or reduced, with a drive speed of the tool drive arrangement which remains the same. It is possible in a simple manner by way of this, to adapt the processing, for example, to different product formats or different product distances in a formation to be produced.

The invention has particular advantages with the processing of objects, which are conveyed in a continuous flow, with which however, the product distances or the desired processing distances may change. Examples on the one hand are the printing, stitching, cutting or other change of products which are conveyed one after the other through a processing region of the device, and/or of a continuous material web. The invention here permits the processing distances to be adapted to the product distances or to other settings. The invention, however, also has advantages with regard to the mere conveying of products with different product distances or lengths, e.g. with the receiving of products from a supplied formation or with their release into a formation to be conveyed away. The invention here permits a receiving and transfer of the products which pays particular attention to the distance, with a conveyor rate which remains the same.

Additionally to the adaptation of the distances at a certain reference location, the device according to the invention may be designed such that the distances between two acting elements, e.g. as with the state of the art according to EP-A 0 606 550, EP-A 0 606 549 or EP-A 0 606 555, are varied between a minimal distance and a maximal distance over the complete course of the revolving path, alone by way of the interaction of tool drive arrangement, tools and a fixedly set guide mechanism. With such a device, the minimal and maximal distance may be set in dependence on one another by way of the invention, so that the distance change is freely selectable within certain limits. This has advantages for example with the singularisation of products from an imbricate formation, or in the opposite case in which products are received individually and are to be condensed into an imbricate formation.

The acting elements may, however, also have a constant distance over large parts of the revolving path, and this constant distance may be increased or decreased by the adjustable guide mechanism only in a part region of the revolving path, for example in order to deposit the products one after the other in a singularised manner in a transfer region. In this case, the guide mechanism may be designed for the cooperation with the tools only in certain regions of the revolving path.

The tool drive arrangement, for example, has a rigid body, which is moved by way of a suitable drive about a rotation axis, e.g. a wheel disk, a spoke design or a ring. The bearing points of the levers therefore describe a circular path, and the acting elements describe approximately a circular path. Such a drive arrangement is simple to realise mechanically. The tool drive arrangement may also however comprise an elongate-flexible conveyor member, e.g. a chain or belt, on which the levers are mounted and which is moved along a path defined by suitable holding members/guide elements, e.g. rails, channels and deflection rollers. The bearing points run along a path which corresponds essentially to the path of the conveyor member. In both cases, the bearing points of the levers are preferably, but not necessarily, located as constant distances to one another on the moved components of the tool drive arrangement.

The guide mechanism preferably comprises a plurality of guide elements which cooperate with levers and which may be moved along a guide element revolving path. The guide elements may, however, also be firmly connected to the lever and run along a changeable cam guide. In both cases, the shape and/or the position of the guide element revolving path is changeable relative to the position of a bearing point revolving path by way of adjusting the guide mechanism. For this, a suitable adjustment mechanism is provided, e.g. a linear motor. A defined revolving path of the guide elements is realised, for example, by way of displaceable cam guides or by way of a mounting on a displaceable rotation body.

The guide elements may themselves be driven, in particular synchronously with the tool drive arrangement, for reducing the degrees of freedom. This then is particularly advantageous when the guide elements are displaceable relative to the tool. For example, analogously to the tool drive arrangement, a rotation body or a conveyor member may serve as guide element drive arrangement and on which the guide elements are mounted at defined, in particular constant distances.

BRIEF DESCRIPTION OF THE DRAWINGS

Examples of the invention are represented in the drawing and are described hereinafter. The figures show purely schematically.

DETAILED DESCRIPTION OF THE INVENTION

A first example of a processing device 10 according to the invention is represented in FIGS. 1a, 1b, 2a and 2b. This comprises several—here eight—tools 20 which are attached on a tool drive arrangement 30 on bearing points 23. The tools 20 in each case comprise at least one lever 21, which at its one end is connected in a pivotable manner to the tool drive arrangement 30 in the manner of a joint 25. The tools 20 moreover comprise an acting element 22 at the other lever end. The tool drive arrangement 30 here comprises a rigid rotation body 31 in the form of a wheel disk, which is connected to a drive shaft arranged coaxially to the rotation body 31. This may be set into rotation by a first drive 33, so that the bearing points 23 are moved along a circular revolving path U1. The pivot axes S of the levers 21 which go through the bearing points 23, run parallel to the drive shaft 32 or to its axis A1. The distances of adjacent bearing points 23 are constant along the periphery of the wheel disk 31.

Figure 1A:
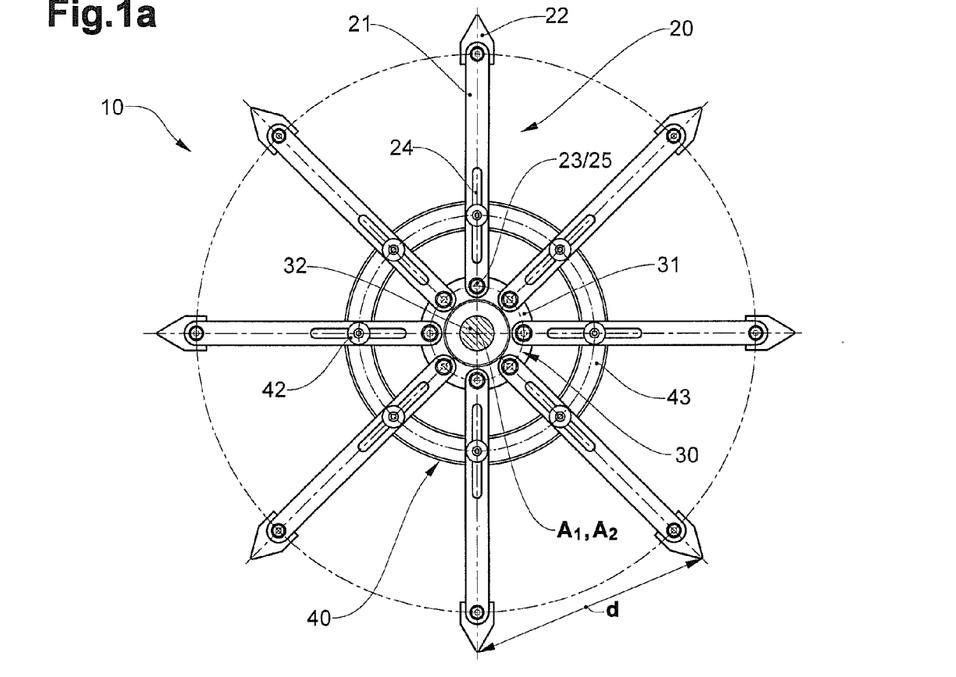
FIGS. 1a and 1b a processing device with an acting element guide arrangement with a rotation body and acting elements, which have two different distances in the processing region, FIGS. 2a and 2b views of the processing device of FIGS. 1a and 1b, perpendicularly to the rotation axis of the rotation body.
Figure 1B:
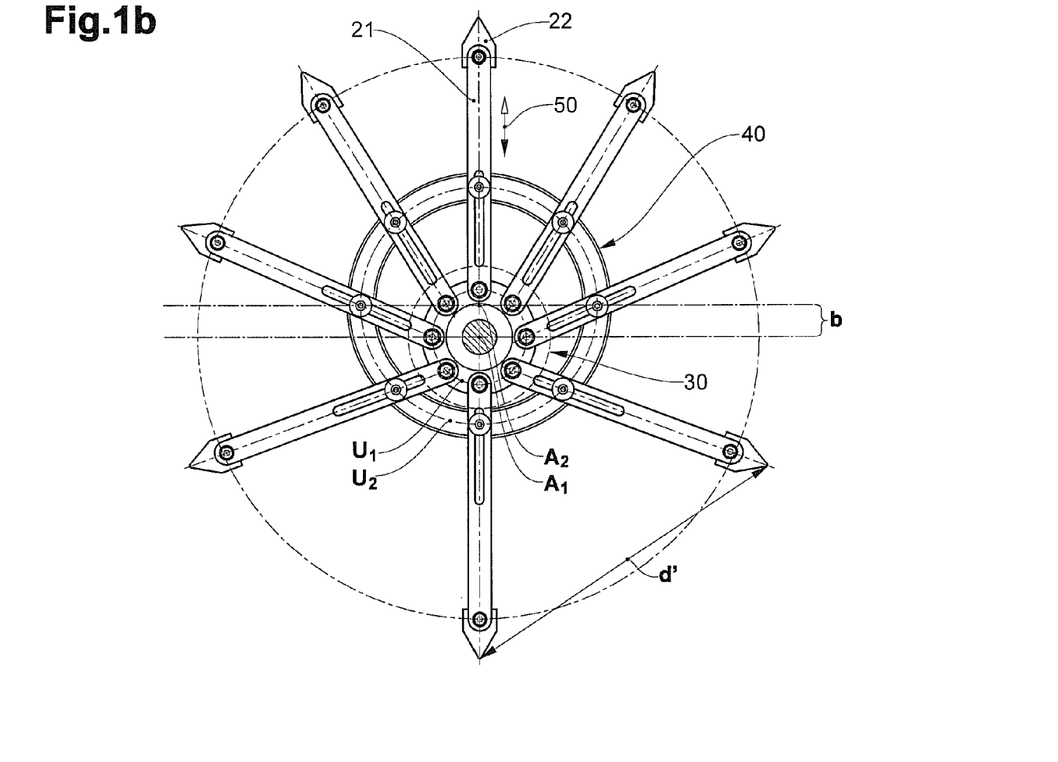

A guide mechanism 40 serves for setting the pivot position of the levers 21 relative to the rotation body 21. This mechanism comprises guide elements 42, which cooperate with the tools 20, as well as a guide element drive arrangement 41 with a rigid rotation body 43, here a further wheel disk, and with a suitable drive 44. The guide elements 42, here guide rollers which are displaceable in elongate holes 24 in the levers 21, are fastened on the further wheel disk 43 at constant distances. They are moved along a circular revolving path U2 by way of movement of the rotation body 43.

Figure 2A:
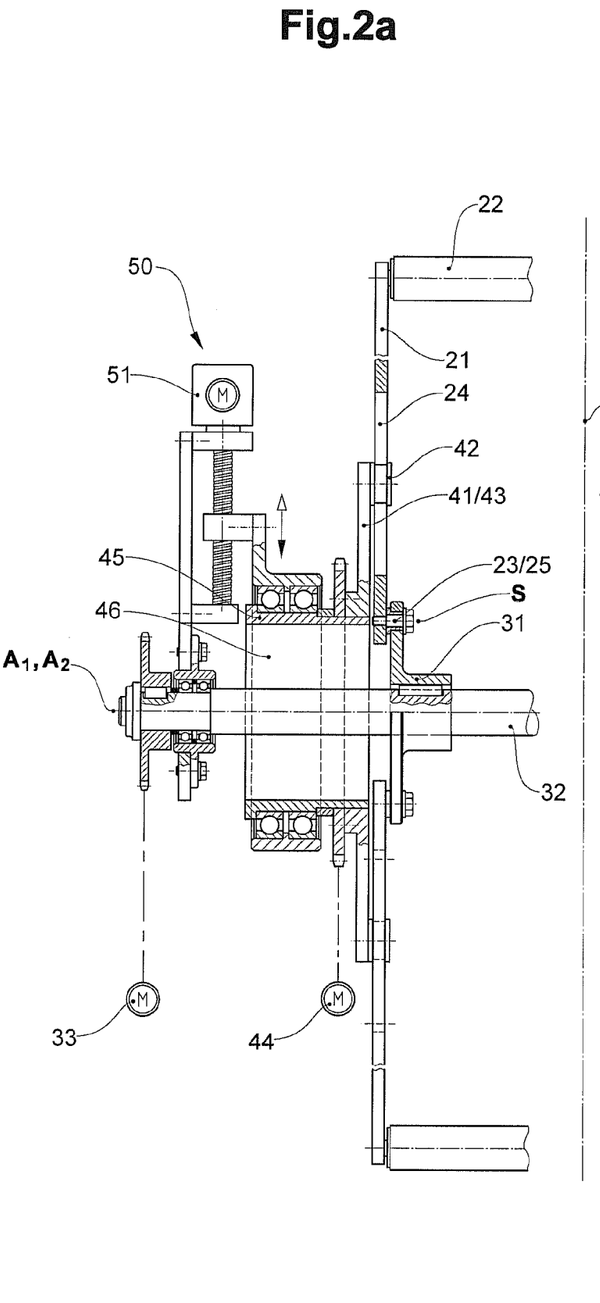
Figure 2B:
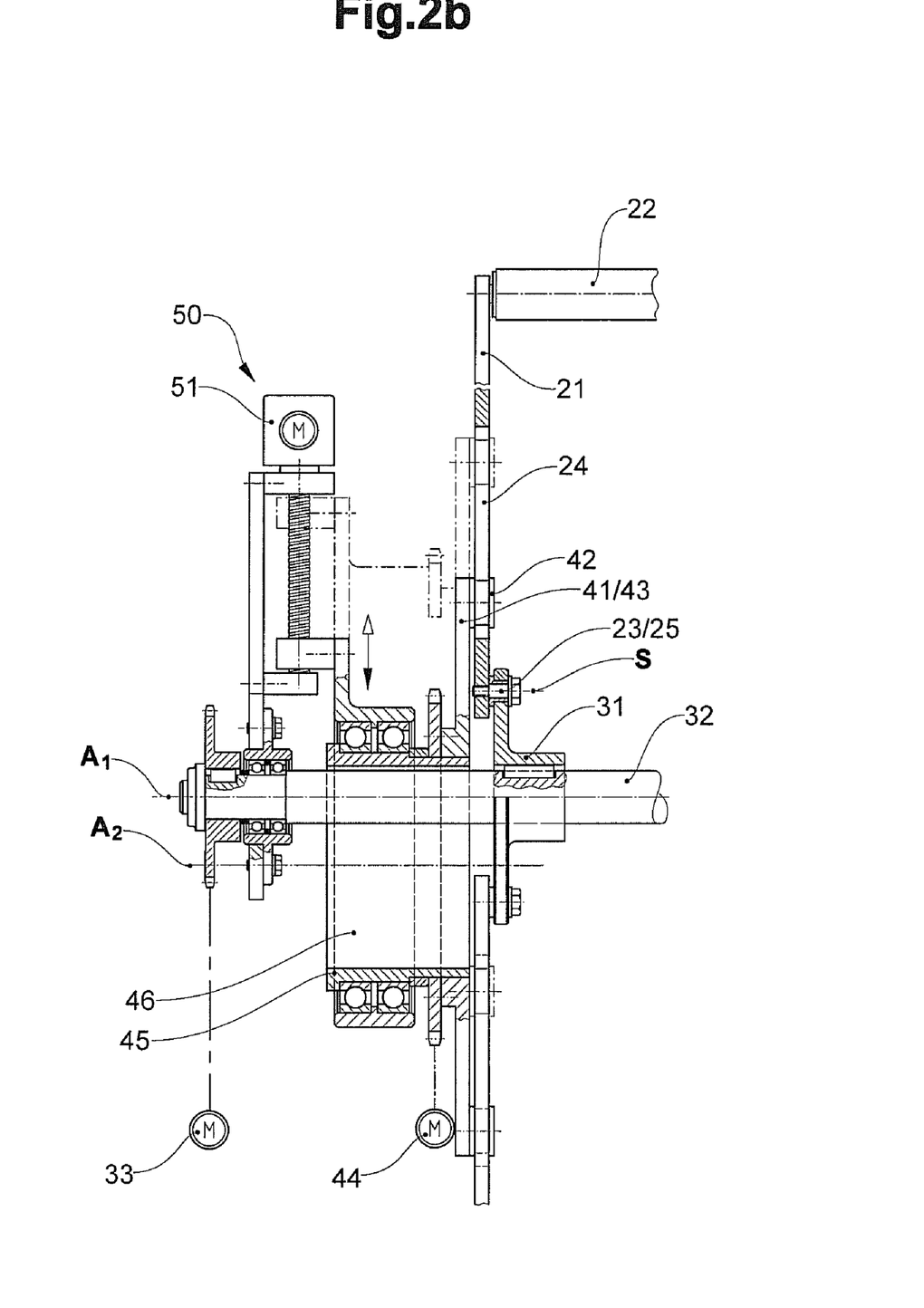

As FIGS. 2a and 2b show, the rotation body 43 has a hollow shaft 45 with a cylindrical lumen 46 and an axis A2. The drive shaft 32 of the tool drive arrangement 30 runs within the lumen 46 at a distance to the inner wall of the hollow shaft 45. The distance b of the axes A1, A2 of the drive shaft 32 and the hollow shaft 45 may be varied by way of an adjustment device 50, in order to realise different relative positions of the two rotation bodies 31, 43.

The adjustment device 50, which is mounted on the housing of the device in a stationary manner, comprises a drive 51 which is coupled to the hollow shaft 45, and may adjust this perpendicularly to the drive shaft 32, here in the vertical direction.

As FIGS. 2a and 2b show, the acting elements 22 may have an elongate extension in the direction of the drive shaft 32. The part device shown in FIG. 2 is therefore preferably designed in a mirrored manner to the plane of symmetry indicated at E. The acting elements are supported at both ends in each case by way of a lever 21 and a corresponding rotation body 31.

The processing device 10 functions as follows. The distance b of the two axes A1, A2 is set with the adjusting device 50. FIGS. 1a and 2a for example show the case b=0, i.e. coinciding axes A1, A2 and thus coaxial rotation bodies 31, 43. FIGS. 1b and 2b show the case b≠0, i.e. axes A1, A2 displaced parallel in the horizontal direction, and thus rotation bodies 31, 43 which are thus mounted eccentrically to one another. Depending on the relative position of the rotation bodies 31, 43, the pivot position of the levers 21 about their bearing points 23 are set in dependence on their position along the revolving path U1. In the case of FIG. 1a, the levers 21 are radially orientated and the distances d between the acting elements 22 is constant. In the case of FIG. 1b, the lever orientation deviates from the radial direction, so that smaller distances d' between the acting elements 22 arise in the upper region of the revolving path U1, and larger distances in the lower region of the revolving path U1. The largest and smallest distance d' may be varied by way of variation of the axis distance b. For example, the levers 21 bunch closer together in the upper region of the revolving path U1 and further apart in the lower region, when b is enlarged.

In the case of application, the rotation bodies 31, 43 are synchronously driven by motors 33, 44. In the case of FIG. 1a, the acting elements 22 in each case have a constant distance d to one another during the movement along the complete revolving path U1. With regard to FIG. 1b, the distance d' of adjacent acting elements 22 changes during the movement, wherein the respective assumed maximal distance and minimal distance as well as the distance d' at any reference location or in any reference region is set by the variable eccentricity b of the two axes A1, A2.

Figure 3:
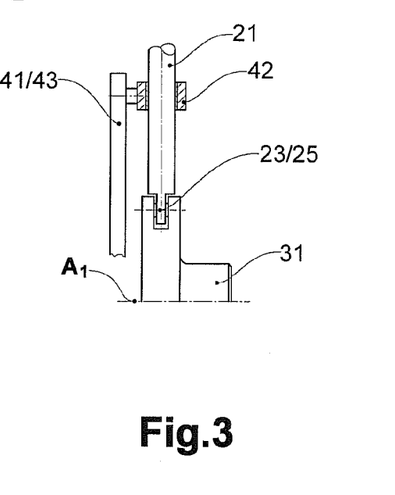
FIG. 3 a detail of the guide mechanism.

FIG. 3 shows an alternative design of the guide mechanism and of the levers 21 in a view perpendicularly to the rotation axis A1. The joint 25 between the levers 21 and the rotation body 31 is designed in the manner of a toggle joint. The guide elements 42 are here designed as sleeves, which may engage around the lever 21 and slide along the lever axis.

Figure 4A:
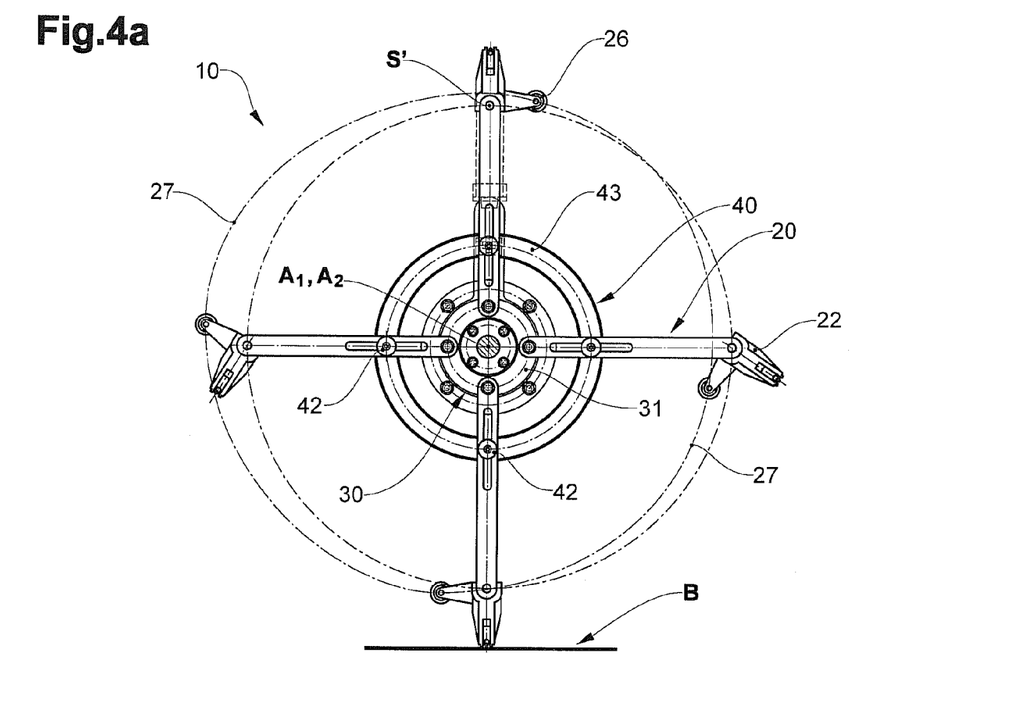
FIGS. 4a and 4b a further processing device with an acting element drive arrangement in the form of a rotation body and acting elements whose pivot position is variable with respect to the lever end by way of additional guide elements.
Figure 4B:
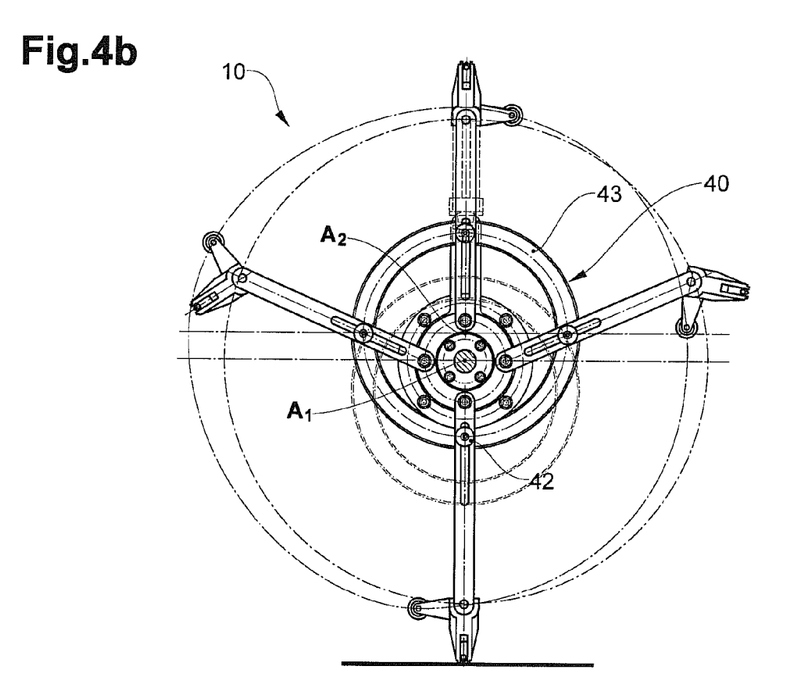

FIGS. 4a and 4b show a further example for a processing device 10 on the basis of a rotation body 31 as part of the tool drive arrangement 30, here with four tools 20. These are designed essentially analogously to the tools according to FIGS. 1a and 1b, with the exception that the acting elements 22 are not rigid, but are attached on the outer-lying lever end in a pivotable manner about pivot axes S' running parallel to the rotation axis A1. The acting elements 22 are moreover coupled to a further guide element 26, with which the orientation of the acting elements 22 relative to the lever 21 may be set. For this, one uses a cam guide for example, which acts on the further guide elements 26 in a complete manner or only in part regions of the revolving path. This variant permits the orientation of the acting elements 22 in a processing region to be freely selected in certain limits, for example for the straight control of the acting elements 22 in a region which is only point-like.

FIG. 4a shows the guide mechanism in a middle (concentric) position; and FIG. 4b shows it in its upper extreme position (lower extreme position dashed).

FIGS. 5a, 5b, 6a and 6b show application examples for the device describe above.

Figure 5A:
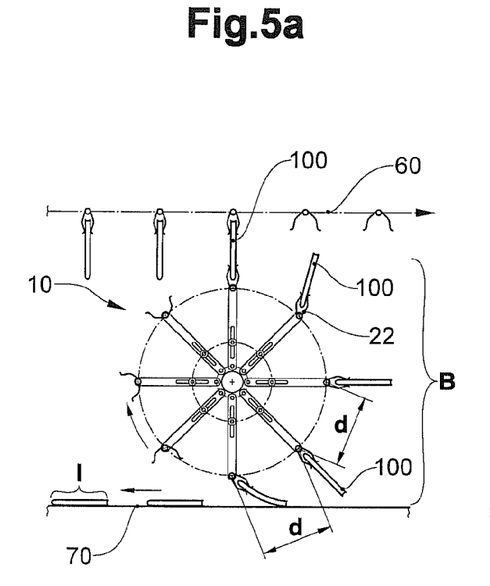
FIGS. 5a, 5b, 6a, and 6b application examples for a device according to FIGS. 1a and 1b.
Figure 5B:
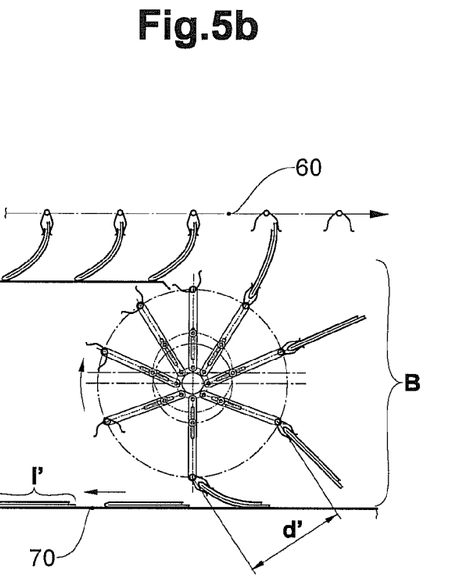

It is shown in FIGS. 5a and 5b, how the products 100 are singularised from a compact formation by way of a device according to the invention applied as a transfer conveyor. The acting elements 22 here are designed as grippers and receive the products 100 which are conveyed past in a continuous manner and in a hanging manner from the feed device 60 in a tightly packed sequence. They deposit these one after the other on a conveying-away device 70 in the form of a conveyor belt. The complete region, in which the device 10 acts in a conveying manner, is indicated as the processing region B. The distance d of the acting elements 22 at the release location at the lower apex of the revolving path U1 is adapted to the desired product distance, which roughly corresponds to the product length l. For resetting to a larger product format l', the distances of the acting elements 22 in the lower region of the device 10 is enlarged by way of displacing the guide mechanism, and the conveyor speed of the conveying-away device 70 is adapted to the increased path speed, so that the products 100 come to lie one after the other on the conveyor belt. The conveyor rates remain the same.

Figure 6A:
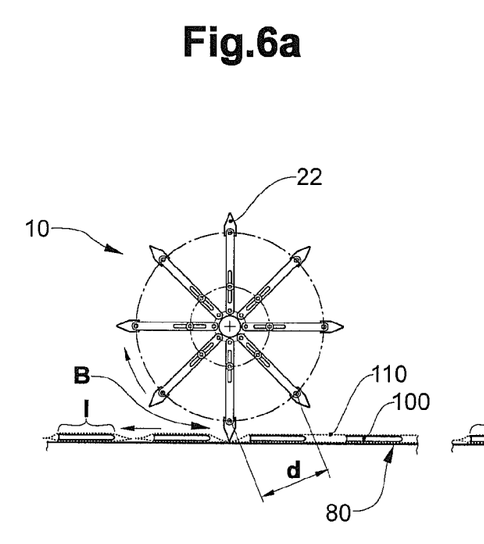
Figure 6B:
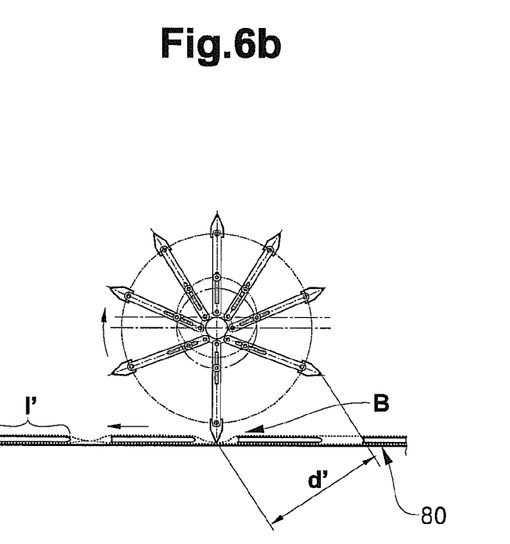

FIGS. 6a and 6b show the processing of a film web 110 conveyed on a conveyor device 80, with products 100 inserted therein, for two different product lengths l, l'. The acting elements 22 are for example welding bars. In the case of FIG. 6a, the distances d of the acting elements 22 in the processing region B are adapted to the shorter product length l which also determines the welding distance. In the case of FIG. 6b, they are adapted to the longer product length l' (distance d') by way of adjusting the guide mechanism, which is not shown here.

On welding, as with other processing, which is not only point-like, it is important for as small as possible relative speeds to occur between the object to be processed and the tool. The drive speed of the processing device 10 therefore with a change of the set spaces d, d' is adapted such that the path speed of the acting elements 22 in the processing region B roughly corresponds to the conveyor speed of the conveyor device 80. With an increase of the processing distances, the path speed in the processing region increases, and the drive speed must therefore be reduced. This is preferably achieved with a suitable control device.

Preferably, the control device is also capable of setting the relative positions of the guide mechanism 40 relative to the tool drive arrangement 30, thus for example the distance b of the axes A1, A2, such that the acting elements 22 assume a defined nominal distance in the processing region B.

Figure 7:
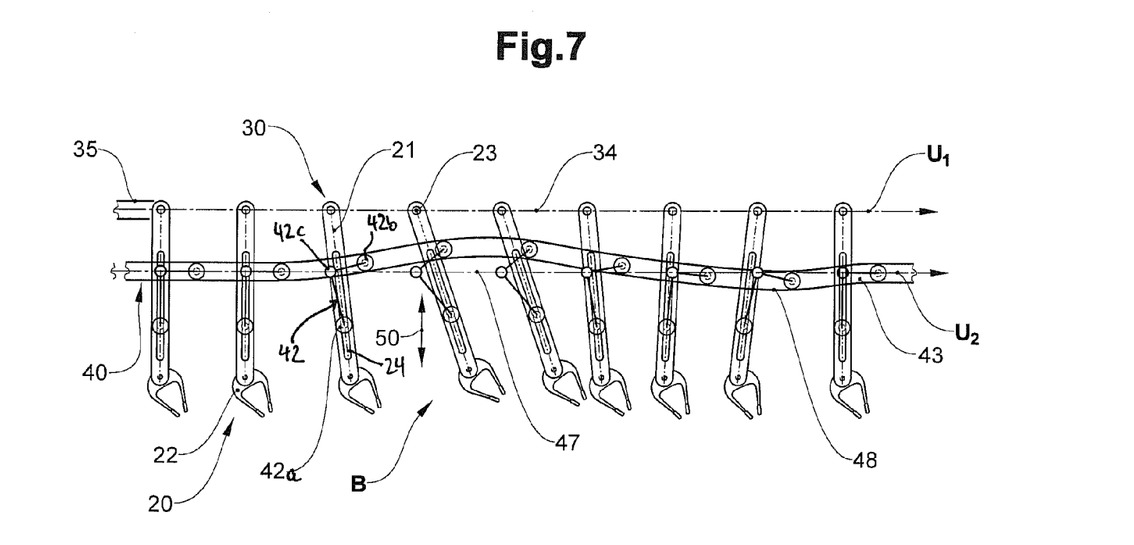
FIGS. 7 and 8 examples for a processing device with a conveyor member as a tool drive arrangement.
Figure 8:
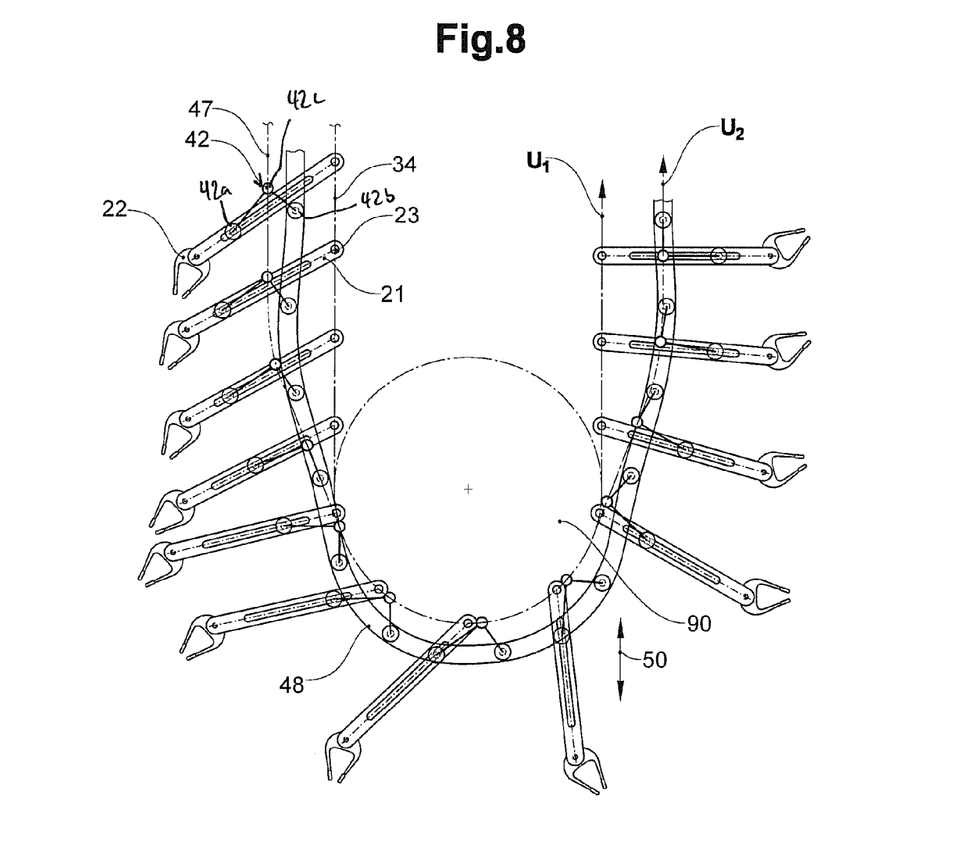

FIGS. 7 and 8 show two examples for a device according to the invention, with a flexible first conveyor member 34 as part of the tool drive arrangement 30, and with a second conveyor member 47 as part of the guide element drive arrangement 41, with which the tools 20 or the guide elements 42 are moved by way of suitable drives along closed (here only shown in a sectioned manner) revolving paths U1 and U2 defined by suitable guide members (only the guide member 35 for the revolving path U1 is shown). The conveyor members 34, 47 are for example chains and the guide members are channels adapted thereto. As with the example above, the tools comprise at least one elongate lever 21, which is pivotably attached at one end on a first conveyor member 34 and at the other end carries the acting element 22. In FIGS. 7 and 8, grippers as acting elements 22 are schematically shown. The bearing points 23, on which the levers 21 are connected to the first conveyor member 34 in a joint-like manner, are equidistant to one another.

The orientation of the levers 21 relative to their drive arrangement 50 is influenced by the guide elements 42 attached on the second conveyor member 34. The guide elements 42 here are L-shaped and carry a first guide roller 42a on a limb of the L, as well as a second guide roller 42b on the other limb. The points 42c, on which the limbs meet one another, are attached on the guide element drive arrangement 41 at constant distances to one another. The first guide rollers 42a, in each case, slide in an elongate hole 24 in the levers 21. The second guide rollers 42 run in a cam guide 48. The orientation of the L-shaped guide element 42 and thus the orientation of the lever 21 is defined by the shape of the guide 48.

A part of the cam guide 48 is displaceable or deformable with an adjusting mechanism 50 which is not shown here, so that variable orientations of the lever 21, and thus also changeable distances of the acting elements 22 results with unchanged paths U1, U2 of the drive arrangement. Instead of a single, for example displaceable guide 48, also several guides connected by way of diverters may be present, which depending on the diverter position, influence the revolving path U2 and thus the distances.

FIG. 7 demonstrates that the principle according to the invention may be applied even with a straight bearing point revolving path U1, if for example the revolving path U2 of the guide elements 42 (or here of the second cam rollers 42b) is curved.

FIG. 8 shows a device with a similar construction of the tools and guide elements as in FIG. 7, but with a curved bearing point revolving path U1 which here is realised by way of a circular deflection 90. In the lower region of the deflection 90, the distances are increased alone by the curvature. The position of the guide 48 and thus also the distance of the tools, may be changed by way of the adjustment mechanism 50 which is only shown schematically.

With both embodiments according to FIGS. 7 and 8, it is also possible for the guide elements 42 only in a part region of the revolving paths U1, U2 to run into a cam guide 48 which is displaceable with the adjustment mechanism 50. The orientation of the tools in the remaining regions of the revolving path U1 in this case is not set in a fixed manner, and arises for example on account of gravity.

Further guide elements and cam guides are present for opening and closing the gripper, which are not represented here.

As a modification of the devices shown here, it is also conceivable to not actively drive the guide elements 42, but to fix the orientation of the levers 21 in another manner, for example by way of several guide elements 42 which are guided in independent guides, or by way of guide elements 42 which are connected to the lever in a fixed manner and which are guided in adjustable guides.

It is also possible by way of the adjustment of the guide mechanism to only change the orientations, but not however the distances of the acting elements in a certain reference region, in order for example to set different acting positions.

Finally, it is also possible to apply the design according to FIGS. 7 and 8 without an adjustment mechanism.

Figure 9:
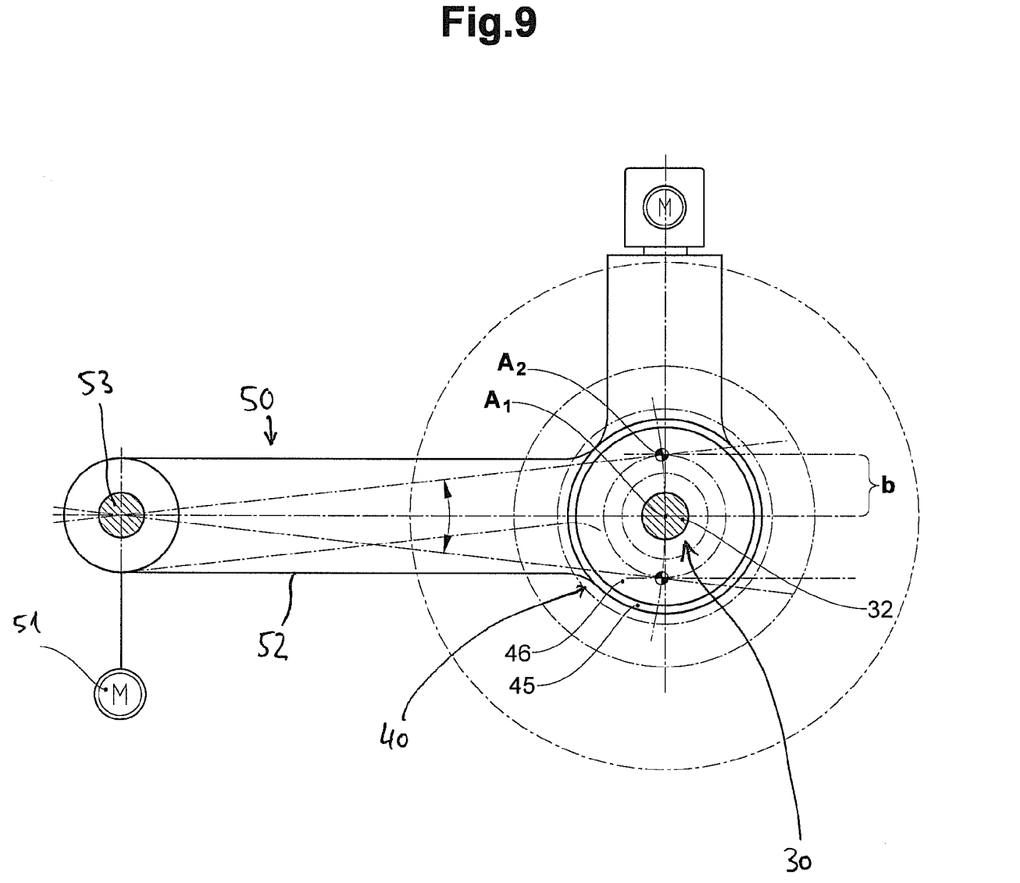
FIG. 9 an example for an adjustment mechanism 50.

FIG. 9 shows an example of an adjustment mechanism 50, which may be applied for a device according to FIGS. 1a, 1b, 2a and 2b as an alternative to the linear motor 51 shown in FIGS. 2a and 2b. The hollow shaft 45 of the guide mechanism 40 is a pivotably arranged via a lever arm about an axis 53 distanced to the rotation axis A1. If the distance of the axes A1 and 53 is selected large enough, this leads to an almost linear displacement of the two axes A1, A2 of the tool drive arrangement 30 and the guide mechanism 40, so that their distance b and thus the distance of the acting elements may be set at a reference point.

The invention claimed is:

1. A device for processing objects comprising:
a tool drive arrangement;
a plurality of tools, wherein the tools comprise at least one lever as well as an acting element which is capable of cooperating with the object, wherein the levers are pivotably attached on the tool drive arrangement on bearing points and may be driven along a closed revolving path by way of movement of the tool drive arrangement, and wherein the acting elements are arranged distanced to the respective bearing point; and
a guide mechanism, by way of which the pivot position of the levers relative to the tool drive arrangement may be set in dependence on their position along the revolving path, wherein the guide mechanism is adjustable, wherein by way of the adjustment of the guide mechanism, different distances of adjacent acting elements in a predefined reference region of the revolving path may be realised and wherein the guide mechanism comprises a plurality of guide elements which cooperate with the levers and which are movable along a guide element revolving path, wherein the shape and/or position of the guide element revolving path relative to the position of a bearing point revolving path may be changed by way of adjustment of the guide mechanism; and
a guide element drive arrangement for driving the guide elements along the guide element revolving path.

2. A device according to claim 1, wherein the position of the guide mechanism relative to the tool drive arrangement may be changed by displacement of the guide mechanism, in particular relative to the tool drive arrangement.

3. A device according to claim 1, wherein the guide elements are mounted in a displaceable manner on the lever, wherein the displacement is in the direction of the lever axis.

4. A device according to claim 1, wherein the bearing points on the tool drive arrangement, and the guide elements on the guide element drive arrangement are arranged in each case at constant distances.

5. A device according to claim 1, wherein the tool drive comprises a first rigid body which is rotatable about a first rotation axis, and the guide element drive arrangement comprises a second rigid body which is rotatable about a second rotation axis and that the first and second rotation axis run parallel to one another at an adjustable distance.

6. A device according to claim 1, wherein the tool drive arrangement comprises an elongate-flexible first conveyor member, in particular a chain or a belt, as well as at least one first guide member which defines the bearing point revolving path and that the guide element drive means comprises an elongate-flexible second conveyor member, in particular a chain or a belt, as well as at least one second guide member which at least regionally defines the guide element revolving path.

7. A device according to claim 1, further comprising in each case one drive or a common drive for synchronously driving the tool drive arrangement and the guide element drive arrangement.

8. A device according to claim 1, wherein the acting elements are designed as processing elements which are capable of changing the object, in particular welding elements, stitching elements, gluing elements, or that the acting elements are designed as conveyor elements, which are capable of receiving the object and conveying it along the revolving path, in particular grippers.

9. A device according to claim 1, further comprising a control device which is capable of setting the guide mechanism according to a nominal distance of the active elements in the processing region.

10. A device according to claim 1, wherein the guide element drive arrangement comprises an elongate-flexible second conveyor member, which is a chain or a belt, as well as at least one second guide member which at least regionally defines the guide element revolving path.

11. A device according to claim 10, wherein the second guide member comprises an adjustable cam guide.

12. A method for processing objects, comprising the steps of:
providing a tool drive arrangement;
providing a plurality of tools, wherein the tools comprise at least one lever as well as an acting element which is capable of cooperating with the object, wherein the levers are pivotably attached on the tool drive arrangement on bearing points and may be driven along a closed revolving path by way of movement of the tool drive arrangement, and wherein the acting elements are arranged distanced to the respective bearing point;
providing an adjustable guide mechanism, by way of which the pivot position of the levers relative to the tool drive arrangement may be set in dependence on their position along the revolving path;
providing a plurality of guide elements which cooperate with the levers and driving the guide elements along a guide element revolving path by means of a guide element drive arrangement,
moving the levers and the acting elements along the closed path through a processing region;
acting on the objects by means of the acting elements at least in the processing region;
adapting the distances of the acting elements in the processing region by way of adjusting the guide mechanism.

13. A method according to claim 12, wherein the step of adapting the distances of the acting elements comprises changing the position the guide mechanism relative to the tool drive arrangement.

14. A method according to claim 12, further comprising:
providing acting elements designed as processing elements;
conveying the objects to be processed with a conveyor device through the processing region ;
adapting the speed and the distance of the acting elements in the processing region to the speed and the distance of the objects on the conveyor device; and
processing the objects with the acting elements.

15. A method according to claim 12, further comprising:
providing acting elements designed as conveyor elements;
conveying the objects with a feed device into the processing region);
transferring the objects to the acting elements;
conveyed the objects through the processing region at a predefined distance or whilst carrying out a predefined distance change;
transferring the objects to a conveying-away device.

16. A method according to claim 12, wherein the step of adjusting the guide mechanism comprises changing the shape and/or position of the guide element revolving path relative to the position of a bearing point revolving path.

17. A device for processing objects comprising:
a tool drive arrangement;
a plurality of tools, wherein the tools comprise at least one lever as well as an acting element which is capable of cooperating with the object, wherein the levers are pivotably attached on the tool drive arrangement on bearing points and may be driven along a closed revolving path by way of movement of the tool drive arrangement, and wherein the acting elements are arranged distanced to the respective bearing point; and
a guide mechanism, by way of which the pivot position of the levers relative to the tool drive arrangement may be set in dependence on their position along the revolving path, wherein the guide mechanism is adjustable, wherein by way of the adjustment of the guide mechanism, different distances of adjacent acting elements in a predefined reference region of the revolving path may be realised;
wherein the guide mechanism comprises a plurality of guide elements, which cooperate with the levers and which are movable along a guide element revolving path, wherein the shape and/or position of the guide element revolving path relative to the position of a bearing point revolving path may be changed by way of adjustment of the guide mechanism;
wherein the bearing point revolving path and the guide element revolving path are each of non-circular shape.

18. A device according to claim 17, wherein the position of the guide mechanism relative to the tool drive arrangement may be changed by displacement of the guide mechanism, in particular relative to the tool drive arrangement.

19. A device according to claim 17, wherein the guide mechanism comprises a plurality of guide elements, which cooperate with the levers and which are movable along a guide element revolving path, wherein the shape and/or position of the guide element revolving path relative to the position of a bearing point revolving path may be changed by way of adjustment of the guide mechanism.

20. A device according to claim 19, wherein the guide elements are mounted in a displaceable manner on the lever, wherein the displacement is in the direction of the lever axis.

21. A device according to claim 19, further comprising a guide element drive arrangement for driving the guide elements along the guide element revolving path.

22. A device according to claim 21, wherein the bearing points on the tool drive arrangement, and the guide elements on the guide element drive arrangement are arranged in each case at constant distances.

23. A device according to claim 21, wherein the tool drive arrangement comprises an elongate-flexible first conveyor member, in particular a chain or a belt, as well as at least one first guide member which defines the bearing point revolving path and that the guide element drive means comprises an elongate-flexible second conveyor member, in particular a chain or a belt, as well as at least one second guide member which at least regionally defines the guide element revolving path.

24. A device according to claim 23, wherein the second guide member comprises an adjustable cam guide.

25. A device according to claim 21, further comprising in each case one drive or a common drive for synchronously driving the tool drive arrangement and the guide element drive arrangement.

26. A device according to claim 17, wherein the acting elements are designed as processing elements which are capable of changing the object, in particular welding elements, stitching elements, gluing elements, or that the acting elements are designed as conveyor elements, which are capable of receiving the object and conveying it along the revolving path, in particular grippers.

27. A device according to claim 17, further comprising a control device which is capable of setting the guide mechanism according to a nominal distance of the active elements in the processing region.

28. A device according to claim 17, wherein the guide element drive arrangement comprises an elongate-flexible second conveyor member, which is a chain or a belt, as well as at least one second guide member which at least regionally defines the guide element revolving path.

29. A method for processing objects, comprising the steps of:
- providing a tool drive arrangement;
- providing a plurality of tools, wherein the tools comprise at least one lever as well as an acting element which is capable of cooperating with the object, wherein the levers are pivotably attached on the tool drive arrangement on bearing points and may be driven along a closed revolving path by way of movement of the tool drive arrangement, and wherein the acting elements are arranged distanced to the respective bearing point;
- providing an adjustable guide mechanism, by way of which the pivot position of the levers relative to the tool drive arrangement may be set in dependence on their position along the revolving path;
- providing a plurality of guide elements which cooperate with the levers and moving the guide elements along a guide element revolving path,
- wherein a bearing point revolving path and the guide element revolving path are each of non-circular shape,
- moving the levers and the acting elements along the closed path through a processing region;
- acting on the objects by means of the acting elements at least in the processing region;
- adapting the distances of the acting elements in the processing region by way of adjusting the guide mechanism in order to change the shape and/or position of the guide element revolving path relative to the position of a bearing point revolving path.

* * * * *